United States Patent
Bettinger

(10) Patent No.: US 6,325,108 B1
(45) Date of Patent: Dec. 4, 2001

(54) PRESTRESSED COMPOSITE CRYOGENIC PIPING

(76) Inventor: David S. Bettinger, 8030 Coventry, Grosse Ile, MI (US) 48138-1119

(*) Notice: Subject to any disclaimer, the term of this patent is extended or adjusted under 35 U.S.C. 154(b) by 0 days.

(21) Appl. No.: 09/336,972

(22) Filed: Jun. 21, 1999

(51) Int. Cl.⁷ .................................................. F16L 9/133
(52) U.S. Cl. .................... 138/153; 138/172; 138/DIG. 5
(58) Field of Search ..................................... 138/125, 153, 138/172, DIG. 5

(56) References Cited

U.S. PATENT DOCUMENTS

| | | | |
|---|---|---|---|
| 3,631,897 | * 1/1972 | Fischer et al. ................. | 138/141 |
| 3,813,098 | * 5/1974 | Fischer et al. ................. | 138/141 |
| 3,854,504 | * 12/1974 | Morrison et al. .............. | 138/153 |
| 4,119,748 | * 10/1978 | Verbauwhede et al. ....... | 138/145 |
| 4,243,075 | * 1/1981 | McPherson et al. ........... | 138/124 |
| 4,370,899 | 2/1983 | Swartout ......................... | 74/572 |
| 4,996,016 | 2/1991 | Walls et al. .................... | 264/229 |
| 5,057,071 | 10/1991 | Piramoon ........................ | 494/16 |
| 5,084,219 | 1/1992 | Sigur ............................... | 264/25 |
| 5,191,486 | * 3/1993 | Sato et al. ....................... | 138/125 |
| 5,236,018 | * 8/1993 | Kobayashi et al. ............ | 138/130 |
| 5,284,996 | * 2/1994 | Vickers ........................... | 405/52 |
| 5,289,942 | 3/1994 | Fawley ............................ | 220/565 |
| 5,324,558 | * 6/1994 | Muto et al. ..................... | 138/129 |
| 5,429,693 | 7/1995 | Rose ................................ | 156/161 |
| 5,499,661 | * 3/1996 | Odru et al. ..................... | 138/125 |
| 5,552,197 | 9/1996 | Bettinger ........................ | 428/34.9 |
| 5,799,705 | * 9/1998 | Friedrich et al. .............. | 138/144 |
| 6,084,052 | * 7/2000 | Aufdermarsh et al. ........ | 528/125 |

* cited by examiner

Primary Examiner—James Hook

(57) ABSTRACT

Performance improved prestressed pipe and hollow member where the additional exterior layer of circumferential wound fiber and thermoset polymer on a cured fiber reinforced composite pipe and hollow member creates compression stresses in the cured pipe and hollow member to offset the tension stresses due to operational temperature loadings. In its preferred embodiment this performance improved prestressed pipe and hollow member makes composite piping for rocket engines practical.

4 Claims, 2 Drawing Sheets

PRESTRESSED COMPOSITE CRYOGENIC PIPING

BACKGROUND OF THE INVENTION a) Field of the Invention

The present invention relates to a performance improved reinforced composite pipe and hollow member wherein the improvement comprises the application of at least one additional exterior layer of circumferential wound fiber and thermoset polymer to a cured fiber reinforced composite pipe and hollow member. The performance improvement results from the prestress tension of the circumferential winding creating compression stresses in the cured pipe and hollow member that counteract the tension stresses due to operational loadings. For the purposes of this invention the generally accepted definition of the term cryogenic is taken as the temperature range from liquid carbon dioxide at minus 80 degrees centigrade to liquid helium at minus 268.9 degrees centigrade.

Composite piping has been judged to be inadequate for general cryogenic applications due to crazing and micro cracking which are visible indications of failure.

For the purposes of this current invention the term "fiber" is defined to mean a slender and greatly elongated shape from natural and synthetic materials which has tensile strength and comprises fiber, thread, fiber bundles, filament bundles, rod, and wire.

For the purposes of this current invention the term prestress is categorized as either macro or micro. "Macro prestress" is defined as when prestress is applied to a composite by mechanical means on the component as a unit, for example by hydraulic, temperature expansion, or pneumatic means. "Micro prestress" is defined as when prestress is applied on an incremental basis to each individual fiber winding to produce a cumulative prestress affect on the component.

b) Description of the Prior Art

Prestress of a tendon, hoop, or membrane is well recognized in a broad range of applications from pre-cast concrete to textile tent structures. In the metal forming art, externally induced prestress has been used to improve the stress response of tubular sections from barrel hoops to gun barrels. However, with polymer composites, a design goal has existed to eliminate internal residual stresses during manufacture. This goal and the reasons behind it have obviated the use of prestress as a performance enhancement for hollow bodies such as tanks and pipes.

Particularly for aerospace composites, care is taken to eliminate residual stresses since this assures the full design stress being available to resist aerodynamic loadings. For polymer composite airframes the elimination of residual stresses assures that the cantilever loads induced by gravity on a plane's wings sitting in a hanger will not add internal stresses to cause long term creep warping of the aerobatic surfaces.

Another reason that prestress winding was not an acceptable tool for composites in the prior art is that prestress sufficient to balance operating loadings would create problems in further steps of the manufacturing process. For example, tensioned fiber would cut into previous layers of the uncured matrix and displace previous layers of fibers. In both aerospace and industrial polymer composites, design procedure dictates that fabrication should be complete prior to cure of the part. Means of cure such as oven baking provides cross-linking which results in an increase in the polymer strength. Substantial cumulative prestress on an uncured composite component would create yielding that would deform the part during curing. The warping of carefully fabricated unstressed composite assemblies during curing has tended to make prestress abhorent.

In the prior art when prestress has been applied to cured composites, it has been accomplished by mechanical means of "macro prestress". Sigur, U.S. Pat. No. 5,084,219, uses thermal expansion of a mandrel to compress previous layers of a composite material into the fiber mesh. The fiber is prestressed under tension. Sigur uses this "macro pre-stress" during manufacture, but the result is not directly related to predictable composite performance. Piramoon, U.S. Pat. No. 5,057,071, accomplishes this "macro prestress" by alternately heating and cooling components prior to assembly. Walls, et. al., U.S. Pat. No. 4,996,016, accomplish this "macro prestress" by the use of a bonding agent under pressure applied to components immediately prior to assembly.

Still another reason the utility of auxiliary prestress has been ignored and avoided for polymer composites has been the comparatively small capacity of some high modulus fibers to resist compressive loads. The cross section of a typical pipe under internal pressure shows that the compression is not axial to the fiber but transverse to the fiber. A patent where circumferential winding is used for fabrication, Fawley, U.S. Pat. No. 5,289,942, carefully uses "insubstantial" to describe the amount of tension or "micro prestress" in the winding. Fawley applies filaments with an "insubstantial" tension to a storage tank, using only enough tension to permit them to adhere to the storage tank and to avoid displacing prior layers of filaments.

"Substantial" prestress does exist in the prior art in Rose, U.S. Pat. No. 5,429,693. Rose uses "micro pre-stress" in the manufacture of a hollow body composite to balance the elongation between fiber and polymer for each layer of a fiber reinforced hollow body using induced strain. Rose is a system for reducing the resultant residual tension stresses in the polymer matrix by nearly half after cure. Rose inflicts "substantial" tension in the fiber (106,000–112,000 psi.). However, Rose induces tension in the fiber both by mechanical means and by expansion of the aluminum mandrel when raised to the curing temperature in order to eliminate manufacturing defects. Rose does not use this prestress to predictably extend hollow body performance under operating loads.

Rose discloses a method of making a prestressed composite material in which prestress is used to balance out inherent stress differences between the polymer and the fiber during construction of the uncured composite material. Although a "substantial" prestress tension is described, it is substantially below that required to overcome tensions caused by operational loadings. This combined micro and macro prestress described by Rose is limited by the ability of an uncured partly assembled composite material to carry the prestress to the mandrel on which it is mounted.

"Substantial" prestress also is taught by Bettinger, U.S. Pat. No. 5,552,197. For cylindrical sections Bettinger uses prestress in the manufacture of pipe connectors that release substantially all their prestress when heated to clamp together pipe members. Bettinger uses this "micro prestress" for assembly, not to predictably extend pipe performance under extreme conditions.

Bettinger discloses composite connectors which generate delayed dimensional change and force due to prestressed fibers constrained and controlled within and by a responsive polymer matrix. Bettinger does not counteract the tension component of the stresses generated under operating conditions that would cause deformation and cracking since most or all of the "micro prestress" is used up in decreasing the diameter during activation.

In the prior art of "micro prestress" Swartout, U.S. Pat. No. 4,370,899, creates a prestress state in a fiber composite material, solid core flywheel rim by winding the fibers with high tensile stress. However, the 50,000 psi. maximum tension winding stress of Swartout is insufficient to counterbalance the tension stresses due to structural, as well as hydraulic, pneumatic, and temperature operational loadings and to improve composite performance under extreme conditions.

SUMMARY OF THE INVENTION

In order to overcome the above-mentioned deficiency and problem in the prior art, this invention teaches a novel prestressed pipe and hollow member, the performance improvement comprising an additional exterior layer which comprises at least one circumferential winding of high modulus fiber and thermoset polymer attached by application means to a cured high modulus fiber reinforced polymer composite generally tubular cyclindrical pipe and hollow member, wherein the prestress tension of the circumferential winding is selected to create compression stresses in the cured composite pipe and hollow member that will balance, offset, and nullify non-elastic tension stresses due to the operational loadings.

Thus, specifically this improvement comprises circumferential tensioned prestressed windings of high modulus fibers such that the magnitude of the tensioned "micro prestress" is selected to counteract the tension component of the stresses generated under operating conditions that would cause deformation and cracking because of the tension stresses that are beyond the elastic range of the polymer at the service temperature. These operational loadings would comprise but are not limited to structural, hydraulic, pneumatic, and temperature loadings. Furthermore, these operational loadings may also include thermal impact stresses that result from differential coefficients of thermal expansion between layers within the cured pipe and hollow member, as well as between components within the cured pipe and hollow member, namely high-modulus reinforcing fibers and the polymer composite matrix.

The term pipe and hollow member is defined to additionally include line, duct, and other appropriate non-solid bodies used to transport or transfer fluids and gases.

1. Objects of the Invention

A general object of the present invention is to improve the performance reliability of polymer composite piping for cryogenic applications.

A further general object of the present invention is to make composite piping practical for industrial processes where corrosive fluids are handled under extreme pressure.

A still further general object of the present invention is to provide design freedom for composite piping with respect to low temperatures.

A still further general object of the present invention is to provide composite piping that exhibits tension deformation reduction under full loading conditions.

A still further general object of the present invention is to provide composite piping that exhibits good reliability and performance longevity with respect to multiple uses i.e., the ability to survive the multiple cycles of thermal shock such as are involved in rocket engine firings.

2. Features of the Invention

In keeping with these objects and others which will become apparent hereinafter, one feature of this invention resides, briefly stated, in the circumferentially tensioned prestressed windings of high modulus continuous fibers such that the magnitude of this tensioned "micro prestress" is selected to nullify the tension component of the stresses generated under operating conditions that would cause deformation and cracking.

Thus, this performance improved composite pipe and hollow member possesses sufficient strain-to-failure range to resist combined mechanical, hydraulic, structural, and temperature stresses resident in the pipe and hollow member during cryogenic/ambient cycling. The induced compressive loads of the present invention balance tension stresses due to both mechanical and temperature effects.

It will be understood by one of ordinary skill in the art that the circumferential prestressing of the high modulus fiber in the additional exterior layers is achieved by placing the cured pipe and hollow member section on a mandrel and spinning the section while filament winding. The winding is done while maintaining a tension in the fiber above 50,000 psi., but lower than 1,000,000 psi. This fiber loading produces compression that is resident until the pipe and hollow member is in operation and internal pressure reverses a portion of that compression.

It will be further understood by one of ordinary skill in the art that the use of 3-D numerically controlled and generated circumferential prestress wrapping of the high modulus fiber in the additional exterior layers allows for the use of spiral, cylindrical, progressive, and helical geometries, as well as any combination thereof by the teaching of this invention.

It will be still further understood by one of ordinary skill in the art that the compressive stress produced by the circumferential overwrap can not exceed the allowable compressive stress of the materials in the cured pipe and hollow member during any phase of its useful life.

It will be still further understood by one of ordinary skill in the art that more than one additional overwrap layer of circumferential wound fiber and thermoset polymer may be required to be applied to a cured fiber reinforced composite pipe and hollow member to achieve the pre-requisite level of prestress and its resultant polymer matrix compression of this invention.

It will be still further understood by one of ordinary skill in the art that circumferential overwrap may consist of as many wraps of prestressed fiber windings as are contained in the cured pipe and hollow member to which it is applied in order to apply the required compressive component to the polymer matrix of the cured pipe and hollow member.

It will be still further understood by one of ordinary skill in the art that the fiber strands of this invention may be prepreged.

It will be still further understood by one of ordinary skill in the art that the polymer used to impregnate the prepreged tension tow will be selected to have a compatible elongation under tension with the fiber.

It will be still further understood by one of ordinary skill in the art that elements of the cured compressive pipe and hollow member may be specified to have compressive performance characteristics compatible with this invention.

It will be still further understood by one of ordinary skill in the art that sheet metal used as a liner to eliminate corrosion and fluid flow erosion on the inside surface of the cured composite pipe and hollow member does not obviate the need for restraint of excessive tension stresses addressed by this invention.

It will be still further understood by one of ordinary skill in the art that various means of activating the surface of the cured pipe and hollow member, such as electric arc, may be used to enhance bonding of the added prestressed layer of this invention.

It will be still further understood by one of ordinary skill in the art that the circumferential winding of tensioned fiber may be bias or angled to achieve ease of manufacture.

It will be still further understood by one of ordinary skill in the art that accelerated curing techniques such as X-ray, electron beam, or UV may be used on each layer of prestressed winding prior to the application of subsequent winding layers.

It will be still further understood by one of ordinary skill in the art that the pipe and hollow member may include bend, offset, tee & cross, Y-branch, or reducer pipe sections, as well as elbow, tee, cross, lateral, or reducer fittings, as well as any combination thereof.

These and other modifications and applications of the present invention will become apparent to those skilled in the art in light of the following description of embodiments in this invention. Drawing Description:

BRIEF DESCRIPTION OF THE DRAWING

The present invention is further described with reference to the accompanying drawing in which.

Figure 1:
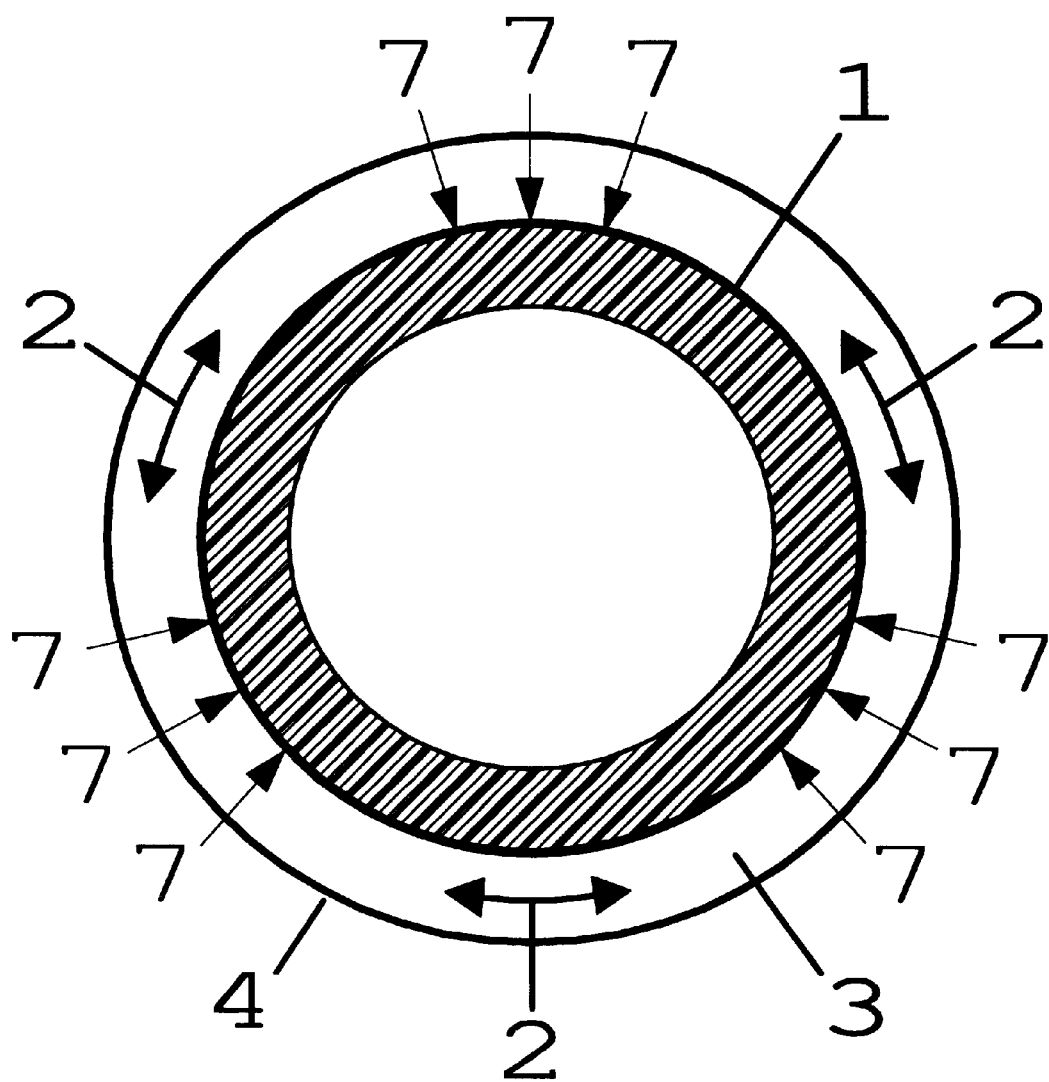
FIG. 1 is a cross sectional view and force schematic of the improved prestressed pipe and hollow member of the present invention.

It will be noted that like objects are like numbered.

DETAILED DESCRIPTION OF THE DRAWING

FIG. 1 shows the improved prestressed pipe and hollow member (4) comprising the cured high modulus fiber reinforced polymer composite pipe and hollow member (1) and the attached exterior overwrap layer (3) which comprises circumferential windings of high modulus fiber and a thermoset polymer. The windings of high modulus fiber are shown schematically to illustrate tension forces in the fiber (2) that create and result in circumferential compressive forces illustrated by radial arrows (7).

Figure 2:
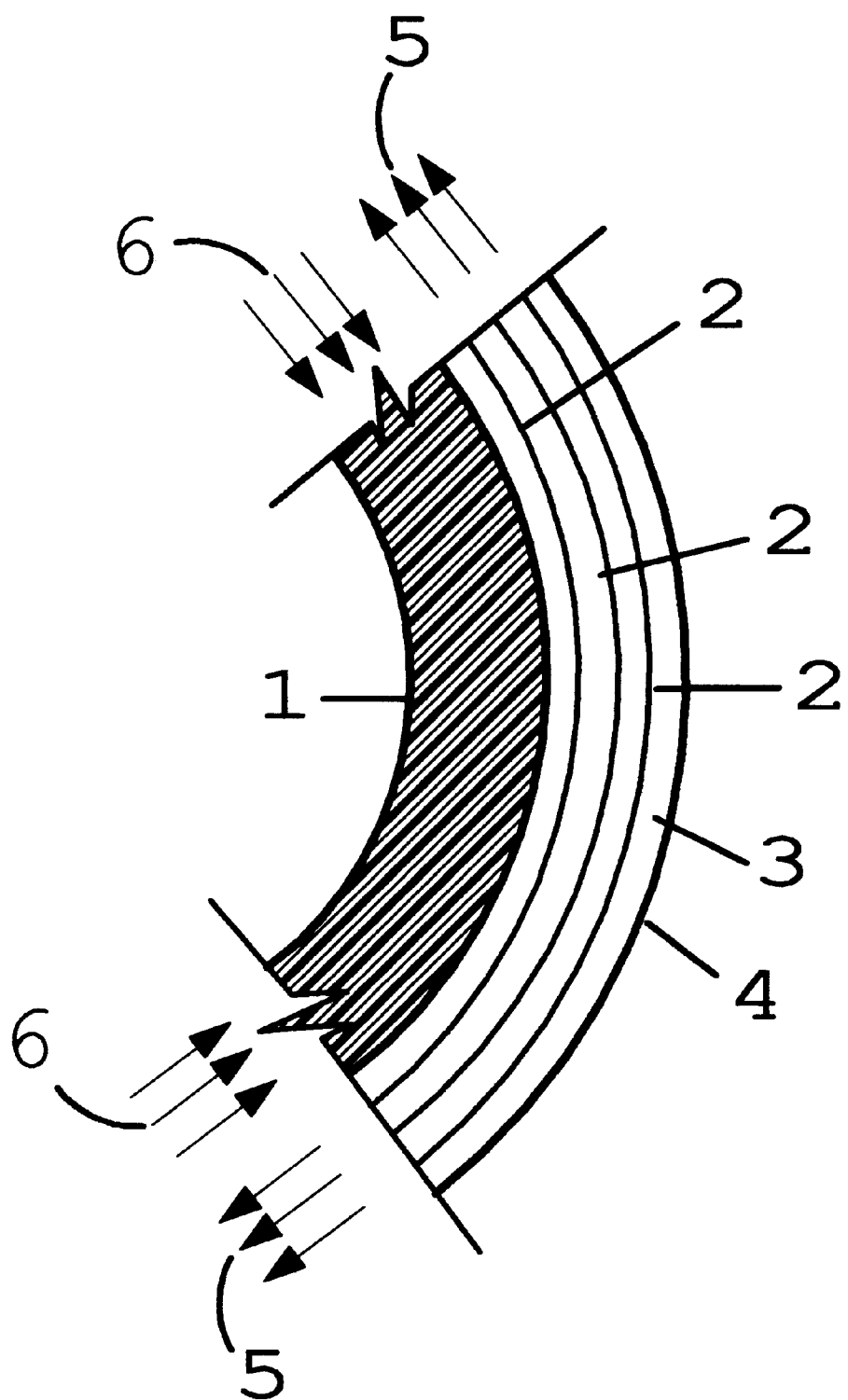
FIG. 2 is an enlarged view of a free body portion of the cross sectional view of the improved prestressed pipe and hollow member of the present invention.

FIG. 2 shows an enlarged view, clearly illustrating the details of, a free body portion of the cross sectional view of the improved prestressed pipe and hollow member (4) comprising the cured high modulus fiber reinforced polymer composite pipe and hollow member (1) and the exterior overwrap layer (3) comprising circumferential windings of high modulus fiber (2), possessing hoop tension illustrated by arrows (5), counter balanced by compression in the cured composite pipe and hollow member shown by arrows (6).

DESCRIPTION OF THE PREFERRED EMBODIMENT

The preferred embodiment of the present invention is as an enhancement to fluid oxygen and hydrogen composite piping, varying up to 16 inches in diameter, used in liquid rocket engines.

The additional exterior layer of circumferential wound high modulus fiber is selected from carbon, glass, Kevlar$^R$, and other polymeric high modulus fibers. The wound fibers possess a tension of greater than 50,000 psi., but less than 1,000,000 psi. and preferably about half of the ultimate tensile strength of the fiber. The preferred fiber is carbon and possesses a preferred tension of 475,000psi.

The additional exterior layer of thermoset polymer is selected from commercial and aerospace quality grades of epoxy thermosets. The commercially available epoxy resins include the diglycidyl ether of bisphenol A, epoxy phenol novolac, and tetraglycidyl-4,4' diamino diphenyl methane. For high-performance aerospace applications tetraglycidyl methylene dianiline is the preferred epoxy thermoset.

EXAMPLE 1

Rocket Engine Piping

The fabrication begins with a cured high modulus fiber reinforced polymer composite pipe section. This pipe section is mounted on a centered mandrel. Next the section is covered with the epoxy thermoset tetraglycidyl methylene dianiline that furnishes high modulus reinforcing in the long direction and serves as a base for the circumferential winding. The tow ends are seated and secured by application means. This means is seating and securing the tow ends with anaerobic adhesive. As the pipe section is rotated, a high modulus carbon fiber prepreg tow is elongated by applying tension. The tension loading in the fiber tow may be as high as half of the ultimate tensile stress. The resultant construction is then finished with a protective layer of thermoset resin.

Numerous alterations of the improved prestressed pipe and hollow member herein disclosed will suggest themselves to those skilled in the art. However, it is to be understood that the present disclosure relates to the preferred embodiment of the present invention which is for purposes of illustration only and not to be construed as a limitation of the present invention. All such modifications which do not depart from the spirit of the invention are intended to be included within the scope of the appended claims.

What is claimed is:

1. A prestressed composite pipe comprising
   a first inner component comprising a high-modulus fiber reinforced polymer-matrix composite, generally tubular, cylindrical pipe and hollow member, and
   a second outer component comprising at least one circumferential winding of high modulus fiber possessing a prestress tension, said winding secured to said first component by polymer attachment means,
   wherein said prestress tension of said circumferential winding is selected for compression stress creation in said first cured polymer matrix component disposed for the balance, offset, and nullification of non-elastic tension stresses due to operational loadings.

2. The improved prestressed pipe and hollow member of claim 1, wherein said operational loadings comprise structural, hydraulic, pneumatic, and temperature loadings.

3. The improved prestressed pipe and hollow member of claim 1, wherein said operational loadings include thermal impact stresses that results from differential coefficients of thermal expansion between layers within said cured pipe and hollow member.

4. The improved prestressed pipe and hollow member of claim 1, wherein said operational loadings include thermal impact stress that results from differential coefficients of thermal expansion between components within said cured pipe and hollow member, namely high-modulus reinforcing fibers and polymer composite matrix.

* * * * *